United States Patent [19]

Parkinson

[11] 4,045,397
[45] Aug. 30, 1977

[54] PRINTING INK COMPOSITIONS FOR JET PRINTING ON GLAZED CERAMIC SURFACES

[76] Inventor: Dean Burton Parkinson, 450 W. Oakwood Blvd., Redwood City, Calif. 94061

[21] Appl. No.: 590,802

[22] Filed: June 27, 1975

Related U.S. Application Data

[63] Continuation-in-part of Ser. No. 571,215, April 24, 1975, abandoned.

[51] Int. Cl.$^2$ .................. C08L 61/10; C10M 3/04
[52] U.S. Cl. .................... 260/29.3; 260/25; 260/33.4 R; 260/38; 260/DIG. 38
[58] Field of Search ............ 260/29.3, 33.4 R, 59, 260/25, 826, DIG. 38, 38; 106/22

[56] References Cited

U.S. PATENT DOCUMENTS

| 2,346,947 | 4/1944 | Wuertz | 106/22 |
| 3,425,974 | 2/1969 | Semroc | 260/826 |
| 3,832,324 | 8/1974 | Parkinson | 260/826 |

Primary Examiner—Theodore E. Pertilla
Attorney, Agent, or Firm—McDougall, Hersh & Scott

[57] ABSTRACT

An ink composition suitable for use in ink jet printing systems and for printing onto glazed ceramic surfaces in which the ink composition is formulated of a soluble, linear, low molecular weight novolac resin, a water and alcohol soluble dyestuff, an organo silicon compound having an organic group attached to the silicon atom containing a highly functional (amino) group, and a diluent of alcohol or alcohol and water in which the components are soluble.

14 Claims, No Drawings

PRINTING INK COMPOSITIONS FOR JET PRINTING ON GLAZED CERAMIC SURFACES

This is a continuation-in-part of my copending application Ser. No. 571,215, filed Apr. 24, 1975, now abandoned entitled "Printing Ink Composition for Jet Printing on Glazed Ceramic Surfaces".

This invention relates to ink compositions suitable for use in ink jet printing systems and for printing on glazed ceramic surfaces.

A number of characteristics are desirable in an ink composition suitable for use in ink jet printing systems. Because of the elements coming into contact with the ink composition in the ink jet printing system, it was initially believed necessary to formulate jet printing ink compositions with a water base for achieving stability during periods of use and non-use in the printing process. In the ink jet printing system, ink composition that is not actually deposited on the substrate is automatically collected and diverted to a return tank. In order to maintain the desired level of viscosity of the ink composition, a dilute solution of ink composition is fed to the return tank in an amount to make up for evaporation losses and for the ink actually removed from the system by imprint on the substrate.

Thus, the printing ink compositions of this invention have been formulated to meet the following characteristics for use in ink jet printing systems:

Absolute viscosity (20° C): 1 to 6 centipoises
Electrical resistivity: ≦1000 ohm-cm
Surface tension: 22.5 to 60 dynes/cm
Sonic viscosity: 1200 to 1800 meters/sec
Specific gravity: .820 to 1.045

A particularly difficult problem of formulation is encountered when printing or writing inks are to be used on glazed ceramic surfaces, such as glass or ceramics, in that stability sufficient for use in a jet printing requires a high degree of solubility, and preferably aqueous compatibility. Yet the imprint upon drying should be relatively insoluble or moisture resistant to provide a high degree of legibility after (1) exposure to 400° F for at least 30 minutes; (2) 2 hours boiling in water; (3) 2 hours exposure to steam at 260° F, and (4) 7 hours exposure in an Atlas Fadeometer. For use in a jet printer, the imprint should be water resistant within five seconds and dry to the touch within five to ten seconds and it should be resistant to moderately severe dry and wet rub when dry.

These characteristics have heretofore been difficult to achieve with ink compositions for writing or printing on glass or other glazed ceramic surfaces because, in the first place, it is difficult to achieve a strong and effective bond to such glazed ceramic surfaces sufficient to meet the boiling water, steam and rub resistant tests, and the requirement for stability and moisture compatibility in the fluid state is somewhat inconsistent with the requirement for insolubility sufficient to resist removal in the presence of steam and boiling water in the dry state.

Nevertheless, in accordance with the practice of this invention, an ink composition has been produced which meets the requirements disclosed above for writing or imprinting upon a substrate such as glass, glazed and the like surfaces of ceramics and which is particularly well adapted for use in ink jet printing systems, and it is an object of this invention to produce an ink composition of the type described.

While the invention will hereinafter be described with reference to an ink composition for printing onto glazed surfaces of glass or ceramics by ink jet printing equipment, it will be understood that the ink compositions of this invention will find beneficial use as a writing or printing ink other than in ink jet printing processes and on surfaces other than glazed ceramic substrates.

A printing ink composition embodying the features of this invention has been formulated to contain as the essential ingredients:

1. a binder in the form of a water dilutable and alcohol soluble, linear, low molecular weight novolac (phenol-aldehyde resin);
2. a water and alcohol soluble dyestuff as the tinctorial agent;
3. an organo silicon compound in the form of a silane as its corresponding silanol having a highly functional (amino, mercapto, or olefinic) group in an organic group attached to the silicon atom; and
4. A diluent in the form of a low boiling alcohol, with or without a small amount of water.

The novolac type resinous binder is an acid catalyzed phenol aldehyde condensation reaction product which, by reason of the reaction on the acid side, yields a low molecular weight polymer which remains soluble because of its linear construction and relative freedom from cross-linking. Such low molecular weight linear novalac resins are relatively water soluble and highly soluble in alcohol or alcohol and water systems.

As the phenolic component, use can be made of cresol and the like phenolic derivatives but it is preferred to make use of phenol, and as the aldehyde it is preferred to make use of formaldehyde but other aldehydes can be used.

Preparation of novolac resins suitable for use in the practice of this invention are well known to the skilled in the art, and are commercially available as from Schenectady Varnish Company under the trade name FRJ-425 (molecular weight 750), and FRJ-508 (molecular weight 500). In the formulation of the ink composition of this invention, novalac resins having a molecular weight average within the range of 200 to 2500, and preferably 400 to 1000, can be used in an amount within the range of 2–30% by weight and preferably in an amount within the range of 2–20% by weight of the ink composition.

Suitable dye components may be represented by the triarylmethane dyestuffs such as Crystal Violet FN (BASF), Victoria Blue B base (Hilton Davis) and the like alcohol and water soluble dyestuffs. Such dyestuffs are employed in an amount sufficient to give the desired color intensity, usually in a concentration of from 0.5–5% and preferably 0.8–3% by weight of the ink composition.

As the organo silicon compound, use is preferably made of an organo silane or its hydrolysis product wherein the organo silane is represented by the formula $R_nSiX_{4-n}$ in which X is a highly hydrolyzable group such as chlorine or other halogen, an amino group such as $NH_2$, or a short chained alkoxy group such as methoxy, ethoxy or other $C_1$ to $C_4$ alkoxy group, $n$ is a number from 1 to 3 and R is an organic group which may vary quite widely from an aliphatic, alicyclic, aromatic, aliphatic aromatic, heterocyclic and the like $C_1$ to $C_{18}$ organic group but in which at least one of the R groups is a $C_1$ to $C_8$ alkyl or alkaryl group in which the alkyl group contains a highly functional group such as an olefinic group, glycidyl group, mercapto group as represented by gamma-methacryloxypropyltrimethoxy silane, vinyltriethoxy silane, but it is preferred to make use of an amino silane such as gamma-aminopropyltriethoxy silane (A-1100 - Union Carbide), N-aminoethylaminopropyltrimethoxy silane (Dow), N-bis($\beta$-hydroxyethyl) gamma-aminopropyltriethoxy silane (A-1100 - Union Carbide). Such silanes or corresponding silanols form stable solutions in alcohol or alcohol and water and can be employed in the ink compositions of this invention in an amount within the range of 0.04–5% by weight and preferably 0.1–0.3% by weight of the ink composition.

While the organo silicon compound and the novalac resin remain compatible to form a stable solution in alcohol or alcohol and water, thereby to enable use in the jet ink printing system of this invention, upon setting the novalac resin and organo silicon compound, particularly the amino silane or its corresponding hydrolysis product, set upon drying to form a water resistant imprint that bonds strongly to glazed surfaces of glass or ceramics and is sufficiently resistant to offset in response to exposure to boiling water or steam or other high humidity conditions to withstand the dry and wet rub tests and the water and steam tests, as previously described.

In the absence of the organo silicon component, the desired insolubilization and adherence of the imprint onto such glazed ceramic surfaces is not achieved. It is believed that upon drying, the amino or other functional group of the organo silicon compound or the hydroxyl group of the hydrolysis product react with the solubilized hydroxyl groups of the novalac resin whereby the organo silicon compound becomes a part of the phenol aldehyde resin to form a silanized phenol aldehyde which becomes sufficiently cross-linked to become water resistant and preferentially attracted to the inorganic silicon oxide groups on the surfaces of the glazed ceramic substrate. Thus a strong and permanent bond is effected between the dried imprint and the surface of the substrate whereby a permanent image of good quality is provided on such otherwise difficult to print surfaces.

The diluent can be varied widely in the amount consistent with the obtainment of the desired viscosity characteristics for the ink composition, as set forth in the specification previously described. As the diluent, it is preferred to make use of a low boiling, fast drying alcohol, such as methanol, ethanol, isopropyl alcohol or other $C_1$ to $C_5$ alcohol alone or in combination with water in which the latter can be present in an amount up to 50% by weight.

The following are representative of ink compositions embodying the features of this invention:

EXAMPLE 1

2% by weight novolac phenolic resin (FRJ-425) - Schenectady Varnish Company)
0.04% by weight gamma-aminopropyltriethoxy silane
2% by weight Crystal Violet FN
94% by weight methyl alcohol

EXAMPLE 2

5% by weight novolac phenolic resin (FRJ-508 - Schenectady Varnish Company)
0.1% by weight N-aminoethylaminopropyltrimethoxy silane
2.0% by weight Victoria Blue B base
61% by weight methanol
30.5% by weight water

EXAMPLE 3

|  | Broad Range | Narrow Range |
|---|---|---|
| linear novolac | 2–30% | 2–20% |
| organo silicon compound | .04–5% | 0.1–0.3% |
| soluble dyestuff | 1–5% | 2–3% |
| alcohol | remainder | remainder |
| water | up to 50% of the alcohol | up to 50% of the alcohol |

The order for combining the ingredients is not important since the materials are taken into solution to form the ink composition, but it is preferred first to form the solution in novolac resin, dyestuff and diluent before addition of the organo silicon component from a solution in alcohol.

It will be understood that changes may be made in the details of formulation and operation without departing from the spirit of the invention, especially as defined in the following claims.

I claim:

1. An ink composition in which the binder component consists essentially of a soluble, linear, low molecular weight novolac resin, and in which the diluent consists essentially of a low boiling alcohol or alcohol and water in which the amount of water does not exceed 50% and which includes a water and alcohol soluble dyestuff, an organo silicon compound in the form of a silane or its hydrolysis product in which the silane has the general formula $R_nSiX_{4-n}$ in which X is a highly hydrolyzable group, $n$ is a number of from 1 to 3, R is an organic group in which at least one of the groups is an organic group containing a highly functional group.

2. An ink composition as claimed in claim 1 in which the novolac resin is an acid catalyzed phenol aldehyde resin.

3. An ink composition as claimed in claim 1 in which the novolac resin has a molecular weight average within the range of 200 to 2500.

4. An ink composition as claimed in claim 1 in which the novolac resin has a molecular weight average within the range of 400 to 1000.

5. An ink composition as claimed in claim 1 in which the novolac resin is present in the ink composition in an amount within the range of 2–30% by weight.

6. An ink composition as claimed in claim 1 in which the alcohol soluble dyestuff is a triarylmethane dye.

7. An ink composition as claimed in claim 1 in which the dyestuff is present in the ink composition in an amount within the range of 0.5–5% by weight.

8. An ink composition as claimed in claim 1 in which the dyestuff is present in the ink composition in an amount within the range of 0.8–3% by weight.

9. An ink composition as claimed in claim 1 in which the highly hydrolyzable group of the organo silicon compound is a group selected from the group consisting of a halogen, an amine, and a $C_1$ to $C_4$ alkoxy group.

10. An ink composition as claimed in claim 1 in which the organo silicon compound is an amino silane or its hydrolysis product.

11. An ink composition as claimed in claim 1 in which the organo silicon compound is selected from the group consisting of gamma-aminopropyltriethoxy silane, N-aminoethylaminopropyltrimethoxy silane and N-bis($\beta$-hydroxyethyl)gamma-aminopropyltriethoxy silane.

12. An ink composition as claimed in claim 1 in which the organo silicon compound is present in an amount within the range of 0.04–5% by weight.

13. An ink composition as claimed in claim 1 in which the organo silicon compound is present in an amount within the range of 0.1–3% by weight.

14. An ink composition as claimed in claim 1 in which the diluent is present in an amount to provide an absolute viscosity within the range of 1 to 6 centipoises at 20° C.

* * * * *